United States Patent [19]

O'Neill

[11] Patent Number: 4,852,842
[45] Date of Patent: Aug. 1, 1989

[54] APPLIANCE SUPPORT APPARATUS

[75] Inventor: Edward O'Neill, San Leandro, Calif.

[73] Assignee: Lucasey Manufacturing Company, Inc., Oakland, Calif.

[21] Appl. No.: 100,527

[22] Filed: Sep. 24, 1987

[51] Int. Cl.$^4$ ............................................. E04G 3/00
[52] U.S. Cl. ................................. 248/280.1; 29/525.1; 248/281.1; 248/123.1
[58] Field of Search ............... 248/280.1, 281.1, 123.1, 248/325, 586, 585, 562, 631; 29/525.1; 267/175

[56] References Cited

U.S. PATENT DOCUMENTS

| 3,498,577 | 3/1970 | Mehr | 248/585 X |
|---|---|---|---|
| 3,547,390 | 12/1970 | Mehr et al. | 248/585 X |
| 4,003,536 | 1/1977 | Sekerich | 248/585 |
| 4,082,244 | 4/1978 | Groff | 248/280.1 |
| 4,160,536 | 7/1979 | Krogsrud | 248/280.1 |
| 4,166,602 | 9/1979 | Nilsen et al. | 248/280.1 |
| 4,266,747 | 5/1981 | Sounder et al. | 248/123.1 X |
| 4,447,031 | 5/1984 | Sounder et al. | 248/280.1 |
| 4,458,605 | 7/1984 | Herring et al. | 267/175 X |
| 4,691,886 | 9/1987 | Wendling et al. | 248/280.1 X |

Primary Examiner—Ramon O. Ramirez
Attorney, Agent, or Firm—Niro, Scavone, Haller & Niro, Ltd.

[57] ABSTRACT

A method and apparatus for supporting an appliance having at least one arm which is mounted at one end to a support surface and adapted at the other end for attachment of the appliance. The method and apparatus also includes a unique biasing system for holding the arm in a variety of user selected and activated orientations. The biasing means is composed of a combination of shock absorbers and springs to provide safe, efficient operation.

13 Claims, 4 Drawing Sheets

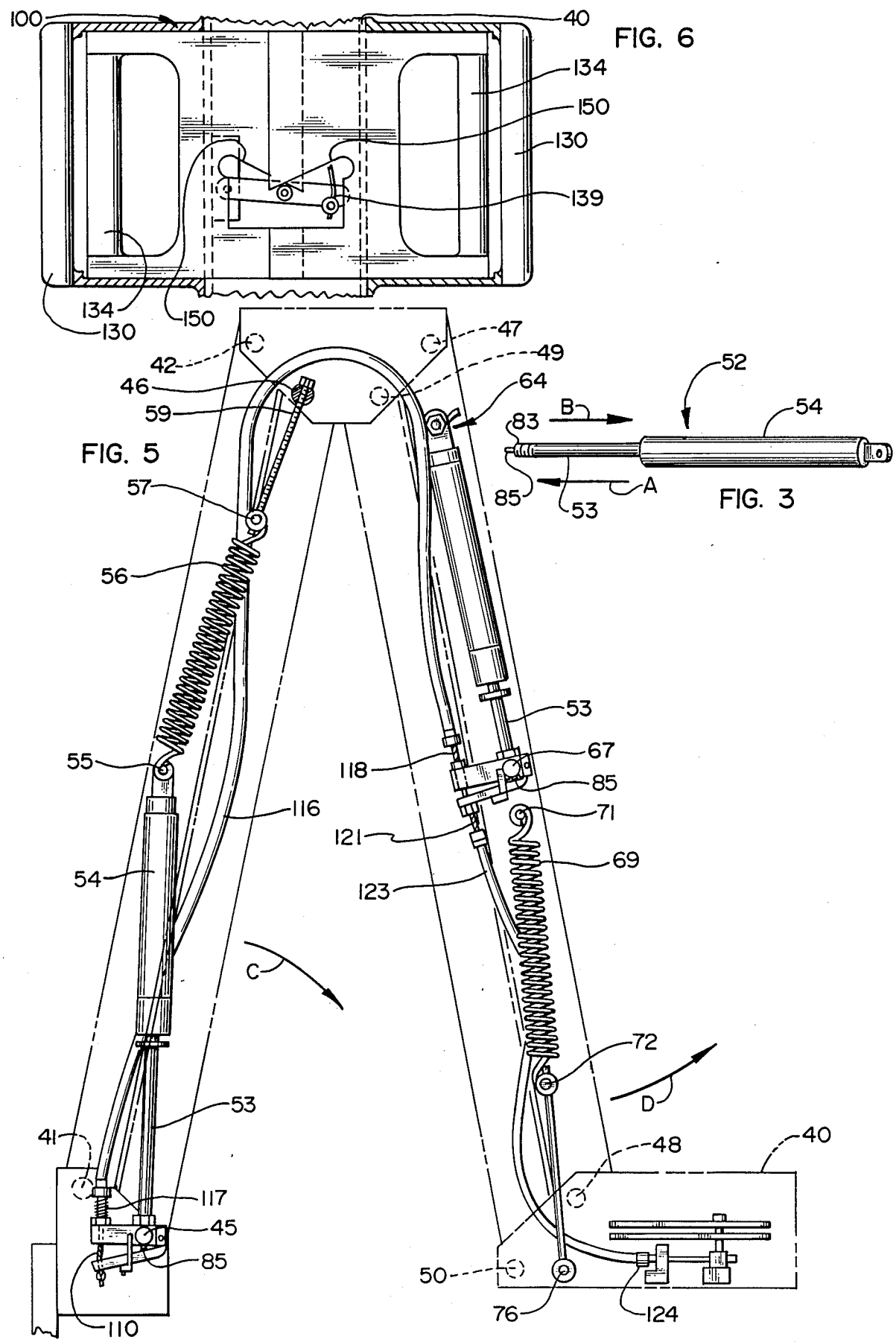

APPLIANCE SUPPORT APPARATUS

BACKGROUND OF THE INVENTION

This invention relates generally to an apparatus having an articulated boom to support an appliance. The invention also relates to a method of controllably supporting, positioning and restraining an appliance. More particularly, the invention relates to an articulated boom comprised of front and rear arms, each arm composed of a mechanical linkage which is biased by a combination of a hydraulic shock absorber and springs to support a load applied to the articulated boom, enabling smooth and controllable orientation of an appliance in a variety of positions.

Prior apparatus for supporting an appliance have employed friction clutches to control movement of the arms of the support apparatus (e.g., see U.S. Pat. No. 4,447,031). These friction clutches provide a positioning/locking feature in the support arms; however, these clutches wear with use, and are therefore susceptible to premature failure.

Another problem inherently associated with certain prior art devices (e.g., see U.S. Pat. No. 4,447,031) is the possibility of the devices causing injury as a consequence of failure of a lock mechanism used on these devices. The lock mechanism is used to secure the support arm in a compact position during installation and maintenance. With the lock mechanism in place, the springs of the biasing system are highly tensioned. If a user or installer inadvertently or improperly disengages the lock mechanism, serious bodily injury can result because the support arm will move quickly and violently.

An additional problem associated with prior art devices using springs alone in the biasing system is the breaking of a spring in the arm. If such a break occurs, the arm and appliance will quickly rise or fall depending upon which arm experiences the spring breakage.

BRIEF SUMMARY OF THE INVENTION

It is therefore an object of the present invention to provide an improved appliance support apparatus and method for eliminating the use of prior art friction clutches and the failure associated with such friction clutches.

It is another object of this invention to provide a novel biasing system for the appliance support apparatus which overcomes the potential for bodily injury associated with prior art lock mechanisms.

It is yet a further object of the invention to provide an improved apparatus having operation throughout a wide variety of appliance load ranges by providing adjustability of the biasing means.

It is an additional object of this invention to provide novel safety features for the appliance support apparatus by selectively enabling the apparatus to move in a controlled or damped manner upon a change in the forces applied to the apparatus.

It is still another object of the present invention to provide improved safety features in the biasing system in the event of spring breakage in the appliance support apparatus.

It is yet another object of the present invention to provide a unique activation system to facilitate use of the appliance support apparatus.

In accordance with the present invention, a support apparatus is provided to position an appliance relative to a support surface, including means for biasing the arm or arms of the apparatus to counteract the weight of the appliance and means for preventing or controlling undesired movement of the apparatus in response to a change in the forces acting on it.

In a preferred embodiment of the invention, an articulated boom is employed having a front arm and a rear arm. Each of the arms is composed of a pair of parallel nested channel type sleeves. Each rear arm sleeve is pivotally mounted at its proximal end to a generally channel shaped rear bracket and pivotally mounted at its distal end to a cap. Each front arm sleeve is pivotally mounted at one end to the cap and pivotally mounted at their other end to a generally channel shaped front mounting bracket. A biasing means of the rear arm of the appliance support apparatus is comprised of a hydraulic shock absorber in combination with springs, preferably both mechanical and gas springs. The hydraulic shock absorber is selectively and adjustably operable by use of a regulator. The springs are also adjustable by means of a spring adjustment device which facilitates adjustment of the spring tension for varying loads, improved safety and increased efficiency of operation. The biasing means of the front arm is also a hydraulic shock absorber in combination with springs, preferably both mechanical and gas springs. Another regulator allows selective and adjustable operation of the hydraulic shock absorber, and the springs are adjustably mounted to another spring adjustment mechanism. This configuration enables a wide variety of appliance loads to be applied because of the adjustability of the springs and also the adjustability of the rate of action of the fluidic shock absorbers.

The hydraulic shock absorbers are operably associated with an actuation device. This actuation device, as well as enabling user activated operation, selectively controls the hydraulic shock absorber regulators. These features provide improved safety and protect the articulated boom, mounting bracket and the support surface from being damaged. Further, if one or both springs break, the support arm will not rise, thus eliminating the possibility of physical injury to maintenance workers or users.

Further objects and advantages of the present invention, together with the organization and manner of operation, will become apparent from the following detailed description of the invention when taken in conjunction with the accompanying drawings wherein like reference numerals designate like elements throughout the several views.

DESCRIPTION OF THE DRAWINGS

FIG. 3 is an elevational view showing a preferred hydraulic shock absorber;

FIG. 5 is a side elevational view of the apparatus of FIG. 1 again illustrating the external components in phantom lines to more clearly depict the internal components;

FIG. 6 is a cross-sectional view taken along line 6—6 of FIG. 7 showing with more clarity the components of the actuation device;

DETAILED DESCRIPTION OF THE PREFERRED EMBODIMENT

The invention disclosed herein is generally designed to support an appliance, and specifically to provide an apparatus whose features prevent undesired movement of the apparatus upon a change of forces acting on the device. To achieve this result, the invention incorporates a unique biasing system which utilizes a combination of springs and controllable hydraulic shock absorbers or air springs. This arrangement not only facilitates the elimination of undesired movement, but also eliminates the necessity for friction elements and lock mechanisms of other devices.

The invention is composed of three basic systems namely, the mechanical linkage, biasing system and activation system. Upon review of the following detailed description, the construction and operation of each of the systems and their interaction will be understood.

Figure 1:
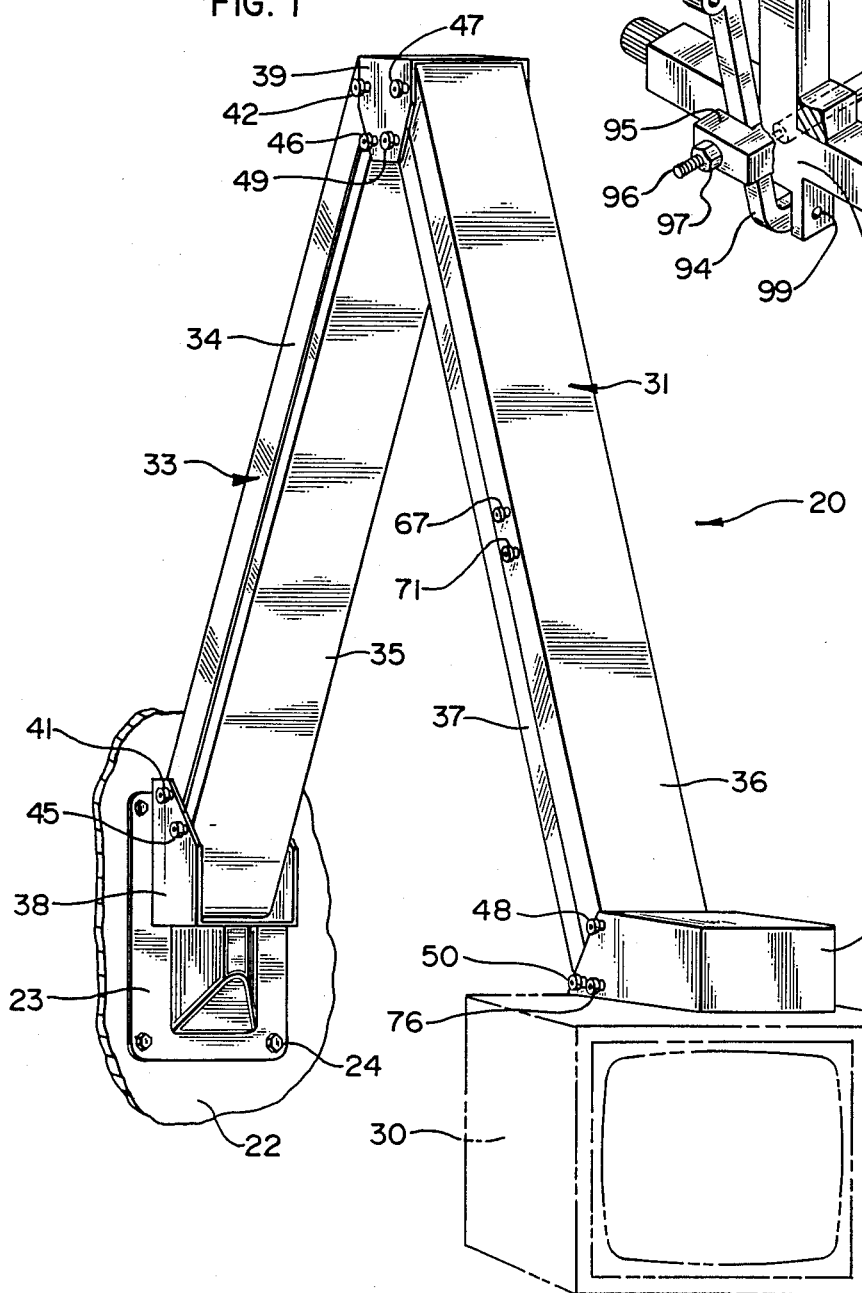
FIG. 1 is a perspective view of an apparatus having an articulated boom constructed in accordance with the present invention with a television set being the depicted load.

Referring to the drawings and particularly to FIG. 1, an articulated boom of an appliance support apparatus constructed in accordance with the present invention is shown generally at 20. The mechanical linkage system of the articulated boom is generally composed of a rear mounting bracket 23, a rear bracket 38, a rear arm 33, a cap 39, a front arm 31 and a mounting bracket 40. This mechanical linkage provides the housing and support for the internal operational systems to be hereinafter described. The articulated boom 20 is installed on a support surface such as wall 22 by means of a conventional mounting bracket 23, which is secured to the wall 22 by means of bolts 24 passing through the mounting bracket 23. The mounting bracket 23 has an integral socket adapted to receive a pin to enable swivel type movement of the articulated boom 20 on the mounting bracket 23. It should be understood that any conventional means may be used to pivotally mount the articulated boom 20 to any support surface. The articulated boom 20 is shown providing support to an appliance 30, such as the television set in FIG. 1. Typically, electrical conductors are also provided (not shown) through the interior of the articulated boom 20 to supply power and/or antenna means to the appliance 30.

The rear arm 33 includes a pair of parallel nested rear channels 34 and 35 (hereinafter, the rear channels 34 and 35), with the rear channel 34 being the upper sleeve and the rear channel 35 being the lower sleeve. The front arm 31 also consists of a pair of parallel nested front channels 36 and 37 (hereinafter, the front channels 36 and 37), with the front channel 36 being the upper sleeve and the front channel 37 being the lower sleeve. Each of the rear channels 34 and 35 are pivotally mounted in parallelogram linkage at their proximal end to rear bracket 38. The rear channels 34 and 35 are also pivotally mounted in parallelogram linkage at their distal end to a cap 39. Each of the front channels 36 and 37 are likewise pivotally mounted in parallelogram linkage at one end to the cap 39 and pivotally mounted at their other end to mounting bracket 40.

Figure 2:
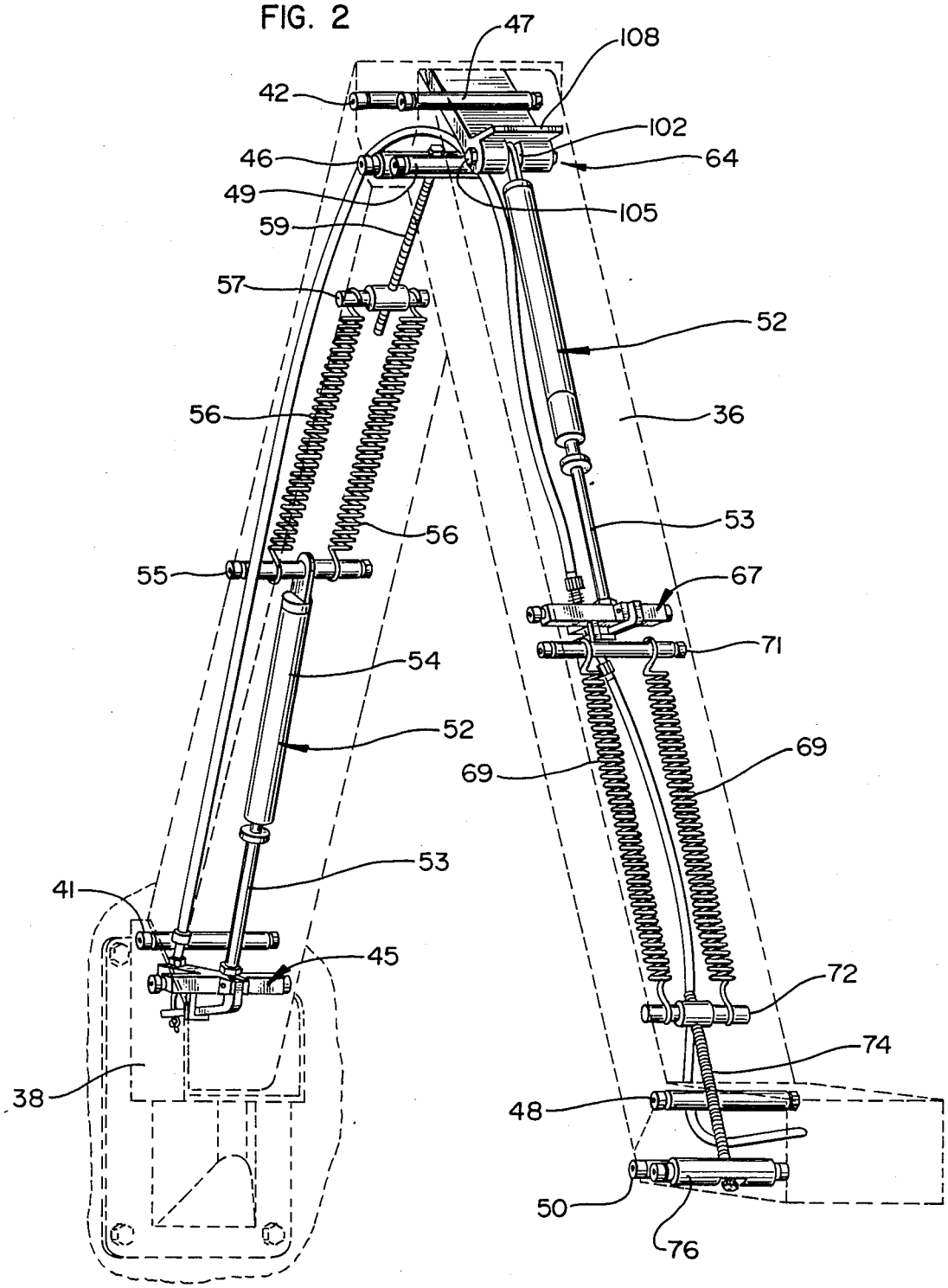
FIG. 2 is a perspective view of the articulated boom similar to that depicted in FIG. 1, illustrating the external components in phantom lines to more clearly depict the biasing means and other internal components.

The details of the construction and operation of the articulated boom 20 can best be understood by reference to FIG. 2. The proximal end of the rear channel 34 is connected to the rear bracket 38 by a first pin 41 (any conventional fastening means may be employed in leiu of a full body pin at all of the pivotal connections). This first pin 41 passes through the rear channel 34 and the rear bracket 38. The rear channel 34 is pivotally mounted with a second pin 42 to the cap 39. The rear channel 35 is pivotally mounted to the rear bracket 38 by a control means 45 (hereinafter described) which also performs a mounting function similar to the first pin 41 in the rear channel 34. An independent pin can be used in lieu of the control means 45; however, such a configuration would be a less efficient use of materials, as well as complicate the construction of the support apparatus. At its distal end, the lower sleeve 35 is pivotally mounted to the cap 39 by means of a third pin 46.

One end of the front channel 36 of the front arm 31 is pivotally mounted to the cap 39 by a fourth pin 47. The other end of front channel 36 is pivotally mounted to a front mounting bracket 40 by a fifth pin 48. Likewise, the front channel 37 is pivotally mounted at one end to the cap 39 by a sixth pin 49 and also pivotally mounted at its other end to the front mounting bracket 40 by a seventh pin 50. All of these pins pass through appropriately sized and aligned holes (not shown) in each of the channels and brackets.

Another basic system of the articulated boom is the biasing means. The biasing means enables controlled operation of the articulated boom and is housed in the mechanical linkage. Generally, the biasing means is composed of air spring/hydraulic shock absorbers 52, springs 56 and 69, spring mounting points 55 and 71 (hereinafter referred to as biasing pins) and control means 45 and 67, which are described in more detail immediately following. The components of the biasing means are then controlled and operated via the actuation system, hereinafter described.

In the preferred embodiment, the biasing means includes a combination of mechanical springs and an air spring/hydraulic shock absorber 52 (e.g., BLOCO-LIFT, a product of Gas Spring Corporation, Colmar, Pa. #167029, 0608070, 0565N, 09/84). For sake of simplicity, the air spring/hydraulic shock absorbers 52 will be referred to hereinafter simply as "shock absorbers." The shock absorber 52 in the rear arm 33 is pivotally connected at its piston end 53 to the control means 45 and pivotally connected at a body end 54 to a biasing pin 55. The biasing means of the rear arm 33 also consists of two springs 56 connected at one end to the biasing pin 55 and connected at the other end to a spring 57 (hereinafter described). A separate pin can be used to secure the end of the springs 56 to the rear channel 34 rather than using the biasing pin 55. And, a number of springs other than two can be used as part of the biasing means for either of the arms 31 and 33. The spring adjustment device 57 is then operably connected to an adjustment bolt 59 at its threaded end, and the adjustment bolt 59 in turn is operably connected at its head end to the third pin 46. The third pin 46 accommodates the adjustment bolt 59 and permits adjustment of the spring tension through an opening (not shown) in the cap 39 by turning the head of the adjustment bolt 59. The opening in the cap 39 can be covered by any suitable means, either after or between adjustments.

In the preferred embodiment, the biasing means of the front arm 31 includes another shock absorber 52 (again, a combined air spring and shock absorber) pivotally mounted at a body end 54 to a shock mounting device, shown generally as 64. The shock mounting device 64 is connected to the cap 39 by any conventional fastening means, including a weldment as shown. The piston end 53 of the front arm shock absorber 52 is connected to a control means 67 mounted to the front channel 36. Two springs 69 are connected at one end to a biasing pin 71 in the front channel 36 and connected at the other end to a spring adjustment device 72. It should be understood that the front arm pin 71 can be eliminated and the springs 69 mounted to control means 67 by using long-eyed springs (not shown). The spring adjustment device 72 is operably connected to an adjustment bolt 74 at its threaded end and operably connected at its head end to a front bracket pin 76. Adjustment of the spring tension in the front arm 31 is identical to that of the rear arm 33, except that adjustment is effected through a space formed (not shown) between the appliance 30 and the front mounting bracket 40 when attached to one another.

In order to more fully understand the operation of the articulated boom 20, and particularly the operation of its biasing means, the nature and operation of the hydraulic shock absorbers 52 is explained by reference to FIG. 3. Both the shock absorbers 52 should be of substantially the same rating and operate in substantially the same manner, hence, like numbers are used for each. The hydraulic shock absorbers 52 consist of the body end 54, having a bore so that it can be pivotally mounted to the shock mounting point 64 or the biasing pin 55, respectively.

The piston 53 of the hydraulic shock absorbers 52 are threaded at a mounting tip 83 so that each can be mounted in the shock actuation devices 45 and 67, respectively. The pistons 53 of the shock absorbers 52 also include regulators 85 which can be depressed totally or in selective amounts depending upon desired operation. The regulators 85 internally enable operation of the shock absorbers 52. When the regulators 85 are fully extended, which is their standard position, the pistons 53 cannot be moved within the rated capacity of the internal air spring of the shock absorbers 52. When the regulators 85 are depressed slightly, the construction of the shock absorbers 52 allows their respective pistons 53 to be compressed with the application of force, in the direction of arrow B in FIG. 3. The more the regulators 85 are depressed, the faster the rate at which the 53 can be compressed by application of a force. When the shock absorbers 52 are in any of their more closed positions, depressing the regulator 85 causes the pistons 53 to extend under the force of the compressed air spring. The more the regulator 85 is derpessed, the faster the piston tends to open in the direction of arrow A in FIG. 3. Thus, in order to achieve the desired safety features, the shock absorbers 52 are set so that the regulators 85 are depressed a predetermined amount which will not allow the shock absorbers 52 to lift, but still will support the aggregate weight of the arms 31 and 33 and the appliance 30. It should be understood that the shock absorbers 52 as disclosed herein are off-the-shelf components well known to those skilled in the art, and they do not in and of themselves comprise the present invention. A variety of alternative structures, such as conventional hydraulic shock absorbers (with or without air springs) will be apparent to those skilled in the art for application in the present invention.

Figure 4:
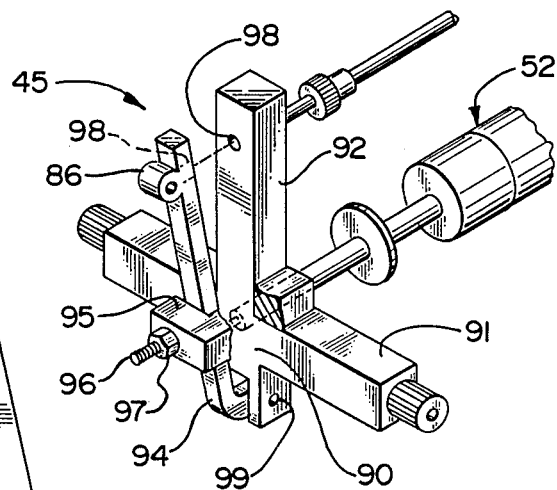
FIG. 4 is a perspective view showing the shock absorber control means.

The mounting and operation of the shock absorbers 52 to the control means 45 and 67 can best be understood by reference to FIG. 4. FIG. 4 specifically discloses the preferred form of the control means 45; however, there are only minor differences between the control means 45 and 67. This difference will become apparent in the description provided hereinafter. The hydraulic shock absorber 52 of the rear arm is mounted to control means 45, which as indicated hereinbefore, also functions as a support or mounting pin in the preferred embodiment. The control means 45 includes a unitary T member 90 having a pin portion 91 and a body portion 92. The intersection of the T member 90 receives a threaded tip 83 (shown inserted at FIG. 4) of the hydraulic shock absorber 52. The shock regulator 85 extends through the threaded bore so that it protrudes from the surface of the T member 90. The body portion 92 has two ends, one slightly longer than the other. The short end of the body portion 92 is notched to receive a control arm 94 which is pivotally mounted to the body portion 92 by means of a pin 99. The control arm 94 is equivalent in length to the body portion 92.

The play of the control arm 94 is selectively limited by an adjustment block 95. The adjustment block 95 is connected to the T member 90, typically by a weldment. The adjustment block 95 has an adjustment screw 96 which is controlled by an adjustment nut 97. The adjustment screw 96 extends through the adjustment block 95. By this arrangement, the control arm 94 can be depressed by turning the adjustment nut 97 which forces the adjustment screw 96 against the control arm 94, thereby depressing the shock regulator 85 a desired amount in order to adjust the rate of shock absorber action. The control arm 94 is in turn operated through bores 98 in the body portion 92 and in the control arm 94 by a cable activation system 100 (hereinafter described, see FIGS. 6–10). As shown in FIG. 2, the body end 54 of the shock absorber 52 is pivotally mounted to the biasing pin 55.

In a manner similar to the mounting of the shock absorber 52 of the rear arm 33, the shock absorber 52 of the front arm 31 is mounted with the threaded tip 83 secured in the control means 67, which is operated and adjusted just as control means 45. However, the control arm 94 is adapted to receive a conventional cable mount (hereinafter described) rather than a conventional cable stop 86 (as shown in FIG. 4, also hereinafter described). The body end 54 is then pivotally mounted to the shock mounting device 64.

The shock absorber 52 is mounted to the shock mounting device 64 by inserting the body end 54 into the notch 102 and inserting the pin 105 through aligned bores in bracket 64 and end 54, thus providing the pivotal mounting. The shock mounting device 64 also has a stop 108. The stop 108 protrudes from the surface of the shock mounting device 64. In the preferred embodiment the stop 108 protrudes along its width, such that when the front arm 31 is in its most compact, retracted position (see FIG. 5), the arm stop 108 contacts the inside surface of the front channel 36, thereby preventing undesired play of the front arm 31 and eliminating possible damage to the shock absorber 52, the front arm 31 and the appliance 30, and also insures that there will be no pinch point between the two arms.

By reference to FIG. 5 the construction and operation of the biasing means of the articulated boom 20 can best be understood with reference to one arm at a time. The rear arm 33 is assembled with the piston 53 in a substantially extended position. The body end 54 of the shock absorber 52 is pivotally mounted about the biasing pin 55. The associated mechanical tension, springs 56 (one shown), are also pivotally mounted to the biasing pin 55. The other end of springs 56 are in turn pivotally mounted to the spring adjustment device 57. The spring adjustment device 57 is adjustably connected to the third pin 46 by the adjustment bolt 59. By tightening the head of the adjustment bolt 59, the tension in the springs 56 can be varied according to the load (e.g., the appliance 30) applied to the end of the articulated boom 20. With the rear arm 33 in its most compact or retracted orientation, as a load is applied to the rear arm 33 or the front mounting bracket 40, and with the regulator 85 activated or preset as described, the rear arm 33 will rotate in the direction of arrow indicator C in FIG. 5. For this arrangement, wherein the control means 45 and the third pin 46 are secured in the rear channel 35, the biasing pin 55 is secured on the rear channel 34 and the arm is rotated in the direction of arrow indicator C, the tension in the springs 56 is increasing, as well as increasing the lifting capability of the shock absorber 52. Thus, when the rear arm 33 is in its lowest position, the load moment is largest and the rear arm 33 needs its maximum lifting capability. This capability is provided by the increased force generated by the springs 56 and shock absorber 52. When the shock regulator 85 is activated, the piston 53 tends to extend and because the damping of the hydraulic fluid, the arm tends to raise smoothly, safely and efficiently.

The hydraulic shock absorber 52 of the front arm 31 is assembled with the piston 53 in a substantially retracted position. The body portion 54 of the shock absorber 52 is mounted to the shock mounting device 64. The piston end 53 is attached to the control means 67 by its threaded tip 85 (shown inserted, see also FIGS. 3-4). The mechanical tension, springs 69 (one shown), are pivotally mounted at one end to biasing pin 71 and at their other end to the spring adjustment device 72. The springs 72 are tensioned in the same manner as the springs 56 of the rear arm 33. Unlike the rear arm 33, however, all of the biasing means mounting points are substantially on line. That is, the free end of the shock mounting device 64, the control means 67, the biasing pin 71 and the front bracket pin 76 are all substantially in line when the front arm is in its most compact and retracted position, as shown in FIG. 5. When the shock regulator 85 is activated as described hereinafter, the piston 53 tends to extend against the internal air spring of the shock absorber and the arm 31 lifts in the direction of arrow indicator D in FIG. 5. As the arm 31 is rotating in the direction of arrow D, the biasing means points 64, 67, 71 and 76 move out of alignment, thereby increasing the lift capability of the shock absorber 52, as the lifting capability of the springs 69 are decreasing. This action tends to level the load curve associated with the front arm 31.

Thus, it will be apparent to those skilled in the art that through appropriate selection of the various pivot points and biasing means mounting points (see, for example, 41, 42, 45-50, 55, 64, 67, 71 and 76) the force generated by the biasing means as the boom moves to different orientations can be controlled in a predetermined manner.

The biasing system of the front arm 31 is arranged in the above described manner so that when the front arm 31 is lifted and an unwanted or abnormal force is applied to the front arm 31, the front arm 31 will descend at a predetermined rate. Such restraint and control over response to the application of an abnormal force or load provides safety and protects the articulated boom 20, the mounting bracket 23 and the support surface 22 from being damaged. This object is achieved if the shock regulator 85 is set the predetermined amount as described hereinbefore. Further, if one or both the springs 69 break, the front arm 31 will not abruptly fall, and the possibility of damage to the articulated boom 20 and physical injury is eliminated.

The third basic system of the appliance support apparatus is the actuation system. This system operates with the control means 45 and 67 through the shock regulators 85, and the cable activation system shown generally as 100 (see FIGS. 6-9). This system enables the user selected orientation as hereinafter described.

As shown in FIG. 5, a shock activation cable 110 is connected with a conventional cable stop 86 to the control arm 94 and runs through the bores 98 of the control means 45. The shock activation cable 110 then runs through the rear arm 33 and the front arm 31, through the bores 98 of control means 67 and to an activation bar (see also FIGS. 6-9, hereinafter described). The shock activation cable 110 is covered by a sheath 116 and connected to the control means 45 by a conventional cable attachment 117. The sheath 116 covers the shock activation cable 110 coupled to a cable attachment 118 which is attached to the control means 67. Attached to an appropriate bore in the control arm 94 is another cable attachment 121 and another sheath 123. The sheath 123 runs from the cable attachment 121 coupled to a cable attachment 124 which is housed in the front mounting bracket 40.

The detailed construction and operation of the cable activation system 100 can best be understood by reference to FIGS. 6-9. The activational components of the cable activation system 100 can be seen in FIG. 6. The cable activation system 100 consists of two outer handles 130 on each side of the front mounting bracket 40 (see also FIGS. 7-9) adjacent to slots (not shown) provided in the front mounting bracket 40. The outer handles 130 contain a groove 132 (not shown in FIG. 6) to slidably receive inner handles 134.

Figure 7:
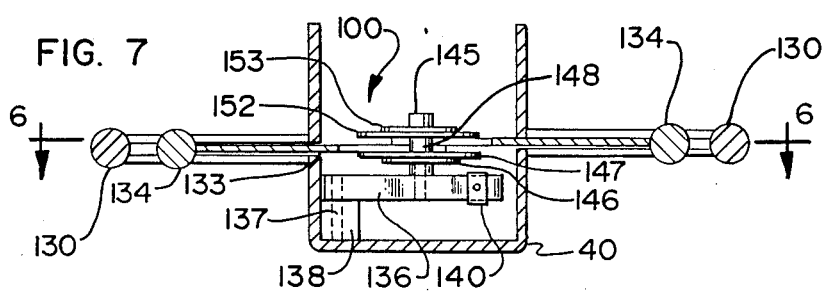
FIG. 7 is a cross-sectional view of the front mounting bracket and shock absorber actuation device taken along line 7—7 of FIG. 9.

Referring to FIG. 7, the cable activation system 100 further consists of the activation bar 136, which is pivotally mounted on one end with a pin 137 coupled to a block 138. The block 138 is attached to the bottom inside portion of the front mounting bracket 40. The other end of the cable activation bar 136 includes a bore 139 (FIG. 6) to receive the shock activation cable 110 (shown inserted in FIG. 7), and a notch (see FIGS. 6, 8 and 9) to conform to the shape of a conventional cable stop 140. Connected to the activation bar 136 is a vertical post 145 which has a series of washers 146 and 147 used to guide the hereinafter described inner handles 134. After placing washers 146 and 147 on the vertical post 145, a needle bearing 148, or other suitable bearing means, is engaged with the angular notches 150 of the inner handles 134 (see FIG. 6). Atop the needle bearing 148 is another series of washers 152 and 153, which again guide and stabilize the inner handles 134. The washers 146, 147, 152 and 153 and the needle bearing 148 are sandwiched by any conventional means.

Figure 8:
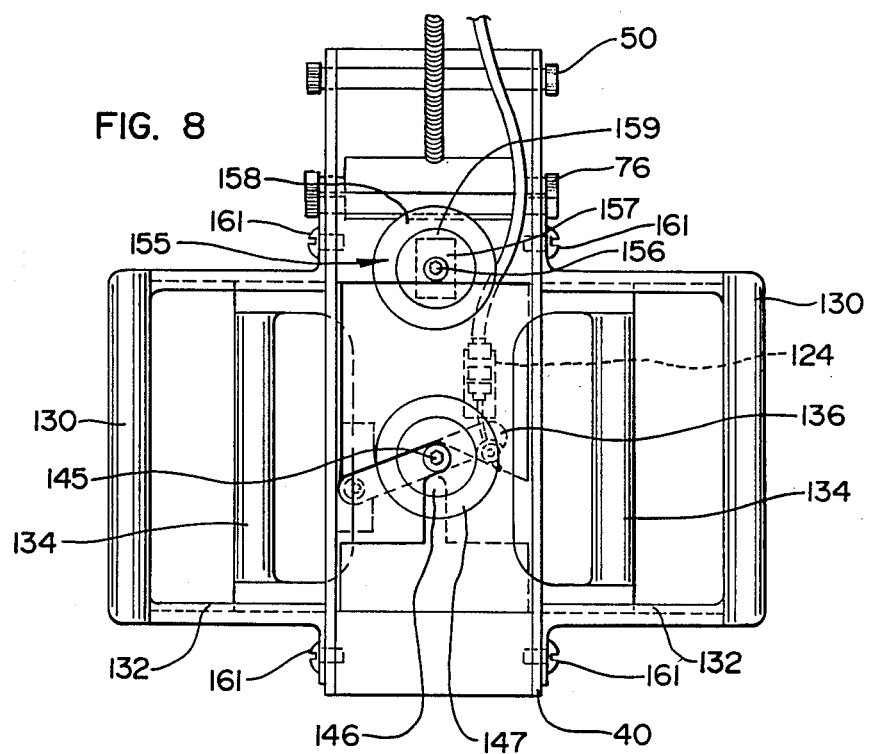
FIG. 8 is a top view of the front mounting bracket with selected exterior portions removed to reveal the details and operation of the shock absorber actuation device shown in a locked position.

Now with reference to FIG. 8, toward the rear of the front mounting bracket 40 is a stabilizer device 155 which also guides and stabilizes the inner handles 134. The stabilizer device 155 consists of a post 156 mounted on a block 157 coupled to the base of the front mounting bracket 40. The post 156 supports the two washers 158 and 159, a needle bearing (not shown), and two more washers (also not shown) and is mounted to provide a means for guiding the rear edges of the inner handles 134.

The inner handles 134 are inserted in the slots 133 on each side of the front mounting bracket 40. The inner handles 134 have angular notches 150 (see FIG. 6). When the inner handles 134 are inserted into the slot 133 (see FIG. 7) atop one another, they are designed to make contact with the needle bearing 148 (see FIG. 6) on their angular notches 150. In its neutral position (as shown in FIG. 8), the roller bearing 148 on the vertical post 145 will be nested in the vertex of the two angular notches 150 of the inner handles 134. The outer handles 130 are then attached to the front mounting bracket 40 by bolts 161 or other suitable fastener means. The inner handles 134 remain slidable within the outer handles 130 by riding in the slots 132 provided in the outer handles 130. These slots 132 are of such a size as to slidably secure the inner handles 134. As shown in FIG. 8 when the cable 110 is inserted through the bore 139, the cable stop 140 is attached and adjusted so that the vertical post 145 is nested in the vertex of the two angular notches 150 of the inner handles 134, such that the cable activation bar 136 will be positioned generally as shown in FIG. 8.

Figure 9:
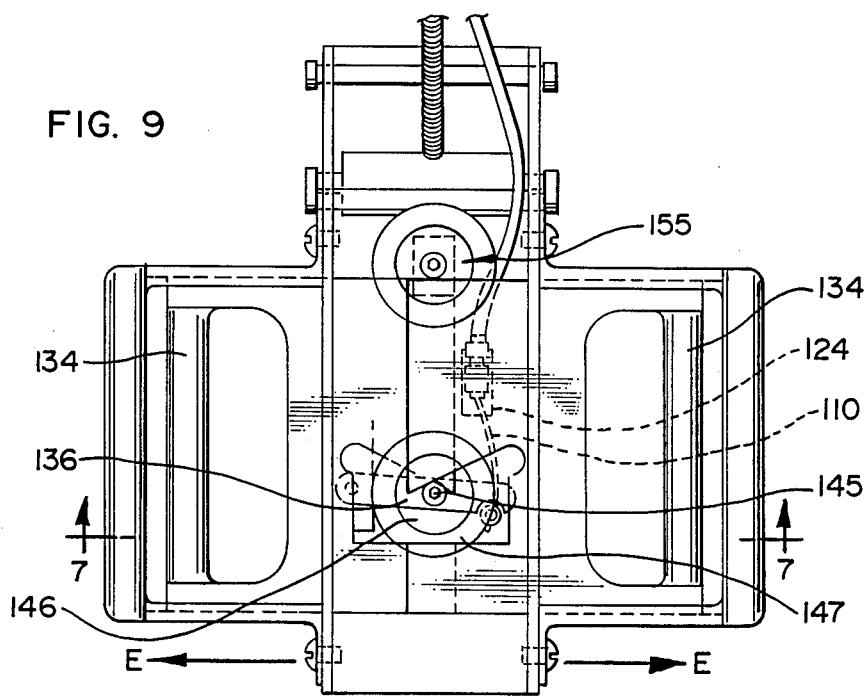
FIG. 9 is a top view of the front mounting bracket shown in FIG. 8 with the actuation device shown in a fully actuated position.

With reference to FIG. 9, when either of the inner handles 134 have been moved in the direction of arrow indicator E, the cable activation bar 136 is forced along the angular notches 150 forcing the cable 110 to extend and engage the shock actuation device 67 (see FIG. 5). With more movement of either of the inner handles 134, the control means 45 is likewise engaged. One can, however, operate the control means 45 and 67 simultaneously. When the control means 67 is engaged, the front arm 31 becomes operable and when the control means 45 is engaged, the rear arm 33 becomes operable and the articulated arm 20 can be placed in the orientation desired by the operator. When the inner handles 134 are released, they return to the position of FIG. 8 because of the force exerted by the regulators 85.

In other embodiments of the present invention, the appliance support apparatus 20 can be mounted to any support surface, such as a horizontal surface, with a simple modification to the rear bracket 38 and the mounting bracket 23. Further, it is possible to practice the present invention using any number of arms greater than or equal to one.

There are numerous advantages the present invention has over those disclosed in the prior art. In the present invention there are no friction clutches to wear out and full pin construction avoids joint failures. Further, the unique biasing system of the present invention prevents injury to the user and apparatus by the elimination of a parking lock device and the ability to preset the shock absorber action rate. The unique activation system also enables the easy and selective orientation of the articulated boom.

While the preferred embodiment of the present invention has been illustrated and described, it will be understood that changes and modifications (some hereinbefore noted) can be made without departing from the invention in the broader aspects. Various features of the invention are set forth in the following claims.

What is claimed is:

1. An apparatus for supporting and positioning an appliance relative to a support surface, comprising:
    at least one arm having a proximal end and a distal end, said one arm being mounted to a support surface at the proximal end and adapted at its distal end for attachment of said appliance; and
    biasing means associated with said one arm for holding said arm in a variety of orientations while supporting said appliance, said biasing means having a spring means and a hydraulic shock absorber cooperating with said spring means, for preventing or damping undesired movement of said apparatus in response to a change in the forces applied to said one arm or appliance.

2. An articulated boom for positioning an appliance relative to a support surface, comprising:
    a base arm mounted to said surface;
    at least one additional arm pivotally connected to said base arm;
    means for securing said appliance to said additional arm;
    spring means for resiliently counteracting the weight of said appliance, said spring means operably mounted to each said arm; and
    a hydraulic shock absorber operably mounted to each said arm and cooperating with said spring means for preventing or damping movement of said boom in response to a change in the forces acting on said boom.

3. An articulated boom for positioning an appliance relative to a support surface, comprising:
    a base arm mounted to said surface;
    at least one additional arm pivotally connected to said base arm;
    means for securing said appliance to said additional arm;
    a spring means for resiliently counteracting the weight of said appliance operably mounted to each said arm;
    a hydraulic shock absorber operably mounted to each said arm and cooperating with said spring means for preventing and damping movement of said boom in response to a change in forces acting on said boom; and
    control means for selectively establishing operability ranges of said hydraulic shock absorber, said control means having at least two operating positions adapted to restrict movement of each said arm when said control means is in a first position and to permit movement of each said arm when said control means is in a second position.

4. The apparatus as described in claim 3 further comprising:
    actuation means for opening and closing of said control means and allowing simultaneous operation of said control means in each of said arms.

5. The apparatus as described in claim 3 wherein said control means includes:
    actuation means for opening and closing said control means to allow sequential operation of said control means in each of said arms.

6. The apparatus as described in claim 3 wherein said biasing means includes:

means for adjusting forces generated by said biasing means to accommodate appliance generated forces of different magnitude.

7. The apparatus as described in claim 3 wherein said biasing means further comprises means for maintaining a constant load curve of an arm throughout its range of operation and forces applied.

8. A method for controllably supporting and restraining an appliance with a support apparatus, comprising the steps of:

coupling a support surface to said support apparatus;

coupling a front support arm of said support apparatus to said appliance;

coupling a rear support arm to said front support arm;

adjusting said front and rear support arms to support said appliance using biasing means associated with eachof said support arms to hold said support arms in anyone of a variety of orientations, said biasing means having a shock absorber means cooperating with a spring means; and controllably and selectively restraining or permitting movement of said support apparatus responsive to a force applied to said support apparatus or appliance using a control means to cooperate with said biasing means.

9. The method as described in claim 8 wherein the control means permits the biasing means to be adjustable between completely restricting reorientation of each said arm when in an open position and freely permitting reorientation of each said arm when in a closed position.

10. The method as described in claim 9 wherein said biasing means is selectively responsive in one or both of said arms.

11. A method for controllably supporting and restraining an appliance with a support apparatus, comprising the steps of:

coupling a support surface to said support apparatus;

coupling a front support arm of said support apparatus to said appliance;

coupling a rear support arm to said front support arm; and adjusting said front and rear support arms to support said appliance using spring means in said arms for controllably orienting each said arm and shock absorber means coupled to each said arm for adjustably restraining the response of each said arm and said appliance to forces applied thereto.

12. The method as described in claim 11 wherein said shock absorber means is responsive selectively in one or both of said arms.

13. An articulated boom for positioning an appliance relative to a support surface, comprising:

a base arm mounted to said surface;

at least one additional arm pivotally connected to said base arm;

spring means for resiliently counteracting the weight of said appliance, said spring means operably mounted to each said arm;

a hydraulic shock absorber operably mounted to each said arm and cooperating with said spring means for preventing or damping movement of said boom in response to a change of forces acting on said boom; and control means for establishing operability ranges of said hydraulic shock absorber, said control means having at least two operating positions, said hydraulic shock absorber adapted to restrict reorientation of each said arm when said control means is in a first or open position, said hydraulic shock absorber adapted to permit reorientation of each said arm when said control means is in a second or closed position.

* * * * *